July 12, 1960 G. W. HENDRICKSON 2,944,435
GEAR SHIFT
Filed March 28, 1958 3 Sheets-Sheet 1
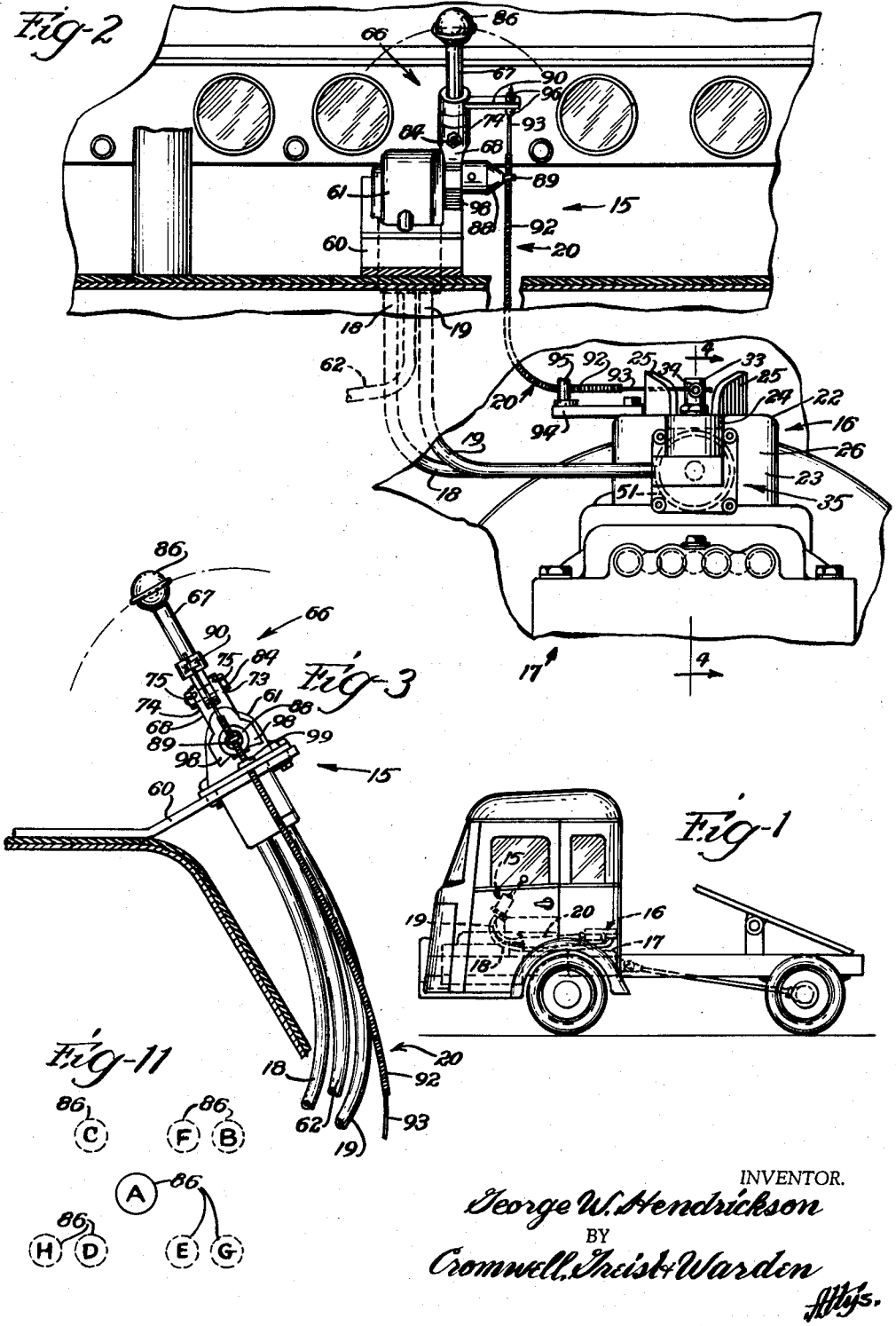
INVENTOR.
George W. Hendrickson
BY
Cromwell, Greist & Warden
Attys.

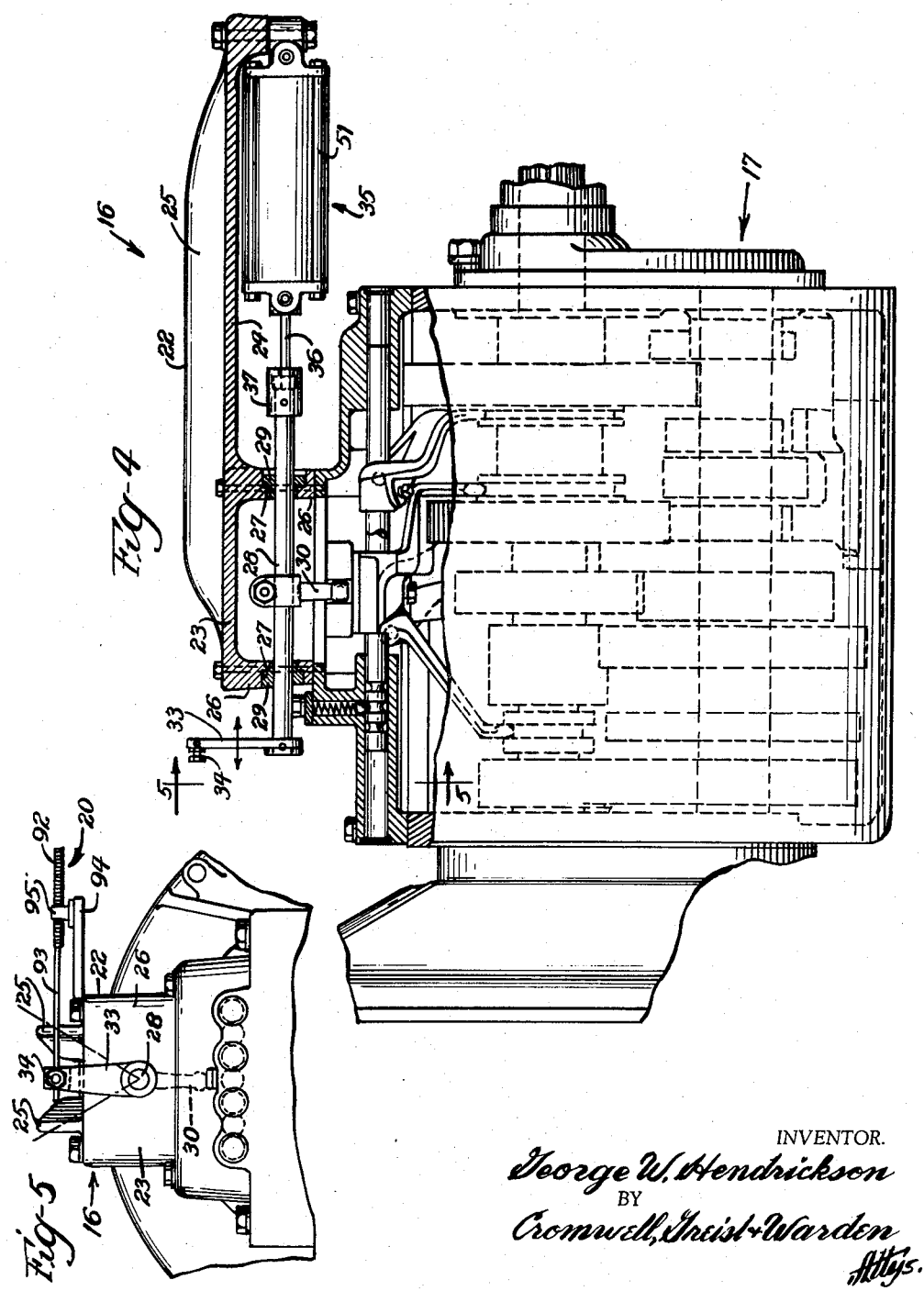

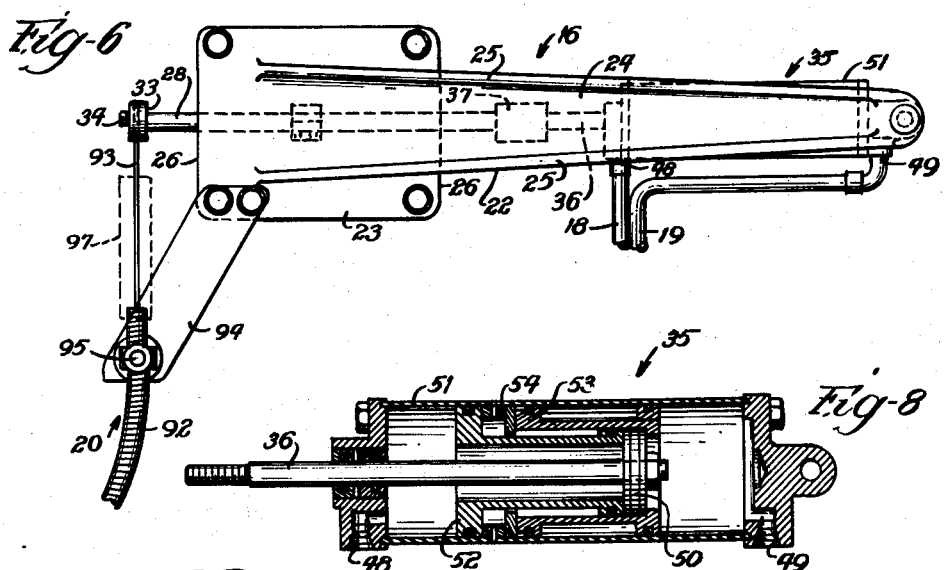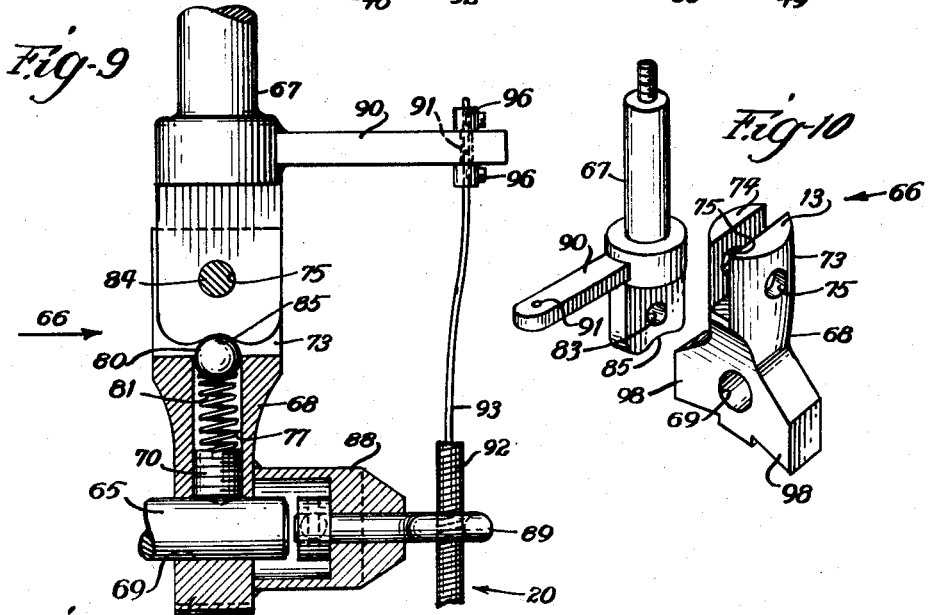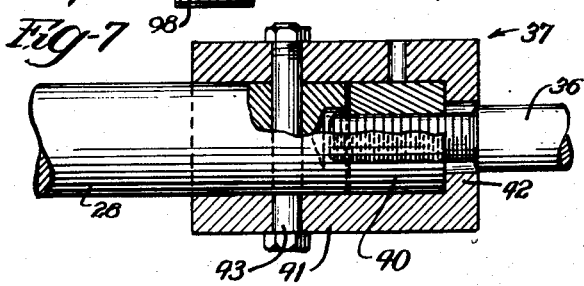

United States Patent Office 2,944,435
Patented July 12, 1960

2,944,435

GEAR SHIFT

George W. Hendrickson, Hinsdale, Ill., assignor to Hendrickson Mfg. Co., Lyons, Ill., a corporation of Illinois Filed Mar. 28, 1958, Ser. No. 724,698

7 Claims. (Cl. 74—335)

This invention relates to a gear shift device for a standard mechanical transmission and particularly to a gear shifting device adapted for use with an installation wherein the shifting lever is physically spaced a considerable distance away from the transmission, as encountered in cab-over-motor trucks.

The development of cab-over-motor trucks and truck tractors wherein the cab body is disposed over the motor created a problem as to the proper gear shifting mechanism to be used therewith. As the standard, mechanical, truck transmission in cab-over-motor vehicles is located to the rear of the motor, the transmission is also disposed to the rear of the cab body and thus, substantially behind the shifting lever therein. Obviously, in this arrangement it is not possible to use the standard shifting mechanism wherein the shifting lever has a ball and socket type connection within a tower fixture carried on the transmission and projects up through the floor of the cab. It has been considered necessary to provide various relatively complex mechanical linkages between the shifting lever in the cab and the transmission disposed to the rear of the cab.

Generally, the only access to the motor of such cab-over-motor trucks and truck tractors is gained by pivoting the cab body upwardly and forwardly about its forward end thus resulting in additional complications as to the gear shifting mechanism. If the gear shifting lever is physically connected to the cab body itself, it is necessary to disconnect the mechanical linkages between the shifting lever and the transmission before tilting the cab to gain access to the motor of the vehicle. Should the gear shifting lever be secured on the chassis with the lever extending upwardly through the floor of the cab body, a relatively long, elongated slot would have to be provided in the floor of the cab body to permit the cab body to be tilted relative to the gear shift lever to allow access to the motor.

Accordingly, it is a general object of this invention to provide a new and improved gear shifting device for installations wherein the shifting lever is physically displaced from the transmission which overcomes the above mentioned disadvantages.

Another object of the invention is to provide a new and improved gear shifting device for a truck or truck tractor or the like having a mechanical transmission located a substantial distance from the shifting lever therefor, in which the shifting lever and its support means are secured to the cab body with the only connections extending therefrom to the transmission being flexible connections permitting the cab body to be tilted forwardly without the necessity of disconnecting the shifting lever from the transmission and without the necessity of providing an elongated slot in the floor of the cab body.

Another object of the invention is to provide a new and improved gear shifting device of the character described wherein the usual shifting finger operable to actuate the shifting rails in the transmission is mounted on an axially shiftable, gear selecting, rock shaft supported adjacent the transmission, wherein transverse movement of the shifting lever in the cab rocks the finger selectively between the shifting rails through a flexible control cable, and wherein movement of the shifting lever forwardly and rearwardly of the cab actuates a valve mounted in the cab for directing pressure through flexible conduits to opposite sides of a cylinder and piston device supported adjacent the transmission and operably connected to the gear selecting shaft to move the shaft axially whereupon the shifting finger actuates the shifting rail with which it is engaged or aligned to provide the desired gear shifting operation.

A further object of the invention is to provide in a device of the character described a shifting lever having its lower end operably connected to a valve wherein movement of the lever either forwardly or rearwardly of a neutral position actuates the valve to direct pressure into either of two outlet connections and wherein the shifting lever is comprised of two portions the upper of which is pivotally connected to the lower portion for movement relative thereto transversely of the cab in opposite directions from a neutral position in which it is aligned with the lower portion of the lever, the latter transverse movements being adapted to actuate a control cable having one end secured to a bracket on the upper portion of the shifting lever.

Certain other objects of the invention will, in part, be obvious, and will in part appear hereinafter. For a more complete understanding of the nature and scope of the invention reference may now be had to the accompanying drawings wherein:

Fig. 1 is a side elevational view of a truck tractor having an over-the-motor tilting cab, having installed therein a transmission operating or gear shifting mechanism constituting one embodiment of the invention;

Fig. 2 is a broken, end elevational view of the invention shown in Fig. 1 looking toward the front of the vehicle in which it is installed and showing in the lower right-hand corner of the view the upper portion of the transmission disposed to the rear of the cab and in the upper portion of the view the shifting lever mounted in the cab;

Fig. 3 is a side elevational view showing the shifting lever and support means therefor as mounted in a cab of a truck or a truck tractor;

Fig. 4 is a vertical sectional view taken generally along line 4—4 of Fig. 2 with a standard mechanical transmission and the shifting rails and gears therein being shown in broken lines;

Fig. 5 is a partial end elevational view taken generally along line 5—5 of Fig. 4;

Fig. 6 is a top plan view of the device as shown in Fig. 4;

Fig. 7 is an enlarged longitudinal sectional view showing the details of the coupling between the piston rod and the gear selecting shaft;

Fig. 8 is an enlarged longitudinal sectional view through the piston and cylinder device shown in Fig. 4;

Fig. 9 is a fragmentary, enlarged elevational view, partially in vertical section, of the shifting lever as viewed from the rear of the cab, as in Fig. 2;

Fig. 10 is an exploded, perspective view showing the upper and lower portions of the shifting lever as viewed from the front of the cab; and Fig. 11 is a diagrammatic plan view showing the standard operating positions of the hand grip of the shifting lever.

As best shown in Figs. 1 and 2, the invention comprises a manually operable shifting mechanism 15 secured in the cab of a cab-over-motor truck, truck tractor or the like of the type wherein the transmission is located to the rear of the cab and a transmission operating mechanism 16 disposed adjacent the transmission. The shifting mechanism 15 and the transmission operating mechanism 16 are interconnected by a pair of flexible hydraulic conduits 18 and 19 and a flexible motion transmitting device or control cable 20 similar in operation to a Bowden wire.

A known type mechanical transmission for a truck, truck tractor or the like is indicated generally at 17 in Fig. 4 and includes the usual gears, shafts, and shifting rails adapted to be actuated in a well known manner to provide a gear shifting operation within the transmission. As the transmission and the elements thereof comprise no part of the invention, they have been shown in broken lines.

The usual tower fitting in which a shifting lever is mounted with a ball and socket type connection in many truck transmission shifting mechanisms is replaced in the shifting mechanism disclosed herein by a bracket member 22, best shown in Figs. 4 and 6. This bracket member 22 is provided at one end with a casing portion 23 which is secured over an aperture in the upper surface of the transmission 17 opening to the shifting rails and includes a cantilevered supporting brace 24, including a pair of vertically extending strengthening ribs 25, extending from the casing portion 23 toward the rear of a vehicle in which the transmission 17 is installed. The front and rear vertically extending walls 26 of the casing portion 23 of the bracket 22 are provided with aligned bores 27 through which extends a gear selecting shaft 28 having end portions extending forwardly and rearwardly from the casing portion 23 of the bracket 22. The shaft 28 is mounted in said casing portion 23 for rotatable or rocking movement as well as for axial or longitudinal movement relative to the casing portion 23. Suitable bearing members 29 for the shaft 28 are provided within the bores 27 in the front and rear walls 26 of the casing portion 23.

The usual transmission shifting finger 30 is mounted on the gear selecting shaft 28 within the casing portion 23 and extends downwardly into the transmission 17 where it may be rocked or rotatably shifted in either direction from a vertical, neutral position into alignment or operable engagement with any one of a series of shifting rails in the usual manner. In the embodiment shown herein, the shifting finger 30 may be aligned with or rotated into engagement with any one of four shifting rails.

In order to rock or rotate the gear selecting shaft 30, a crank arm 33 is secured to the forwardly extending end thereof externally of the casing portion 23, said crank arm 33 being provided with a ball and stud assembly 34 extending normally to the end thereof.

A piston and cylinder device 35 is supported from the underside of the cantilevered supporting brace 24 of the bracket 22 so that a piston rod 36 thereof extends toward the casing portion 23 of the bracket 22 substantially in alignment with the gear selecting shaft 28. The end of the piston rod 36 is connected to the rearwardly extending end of the gear selecting shaft 28 externally of the casing portion 23 of the bracket 22 by a coupling device 37 which insures axial or longitudinal movement of the shaft 28 in response to movement of the piston rod 36 of the piston and cylinder device 35 yet which permits rotation or rocking movement of the shaft 28 relative to the piston rod 36.

The details of the coupling device 37 are best shown in Fig. 7 and include an internally threaded plug member 40 secured on an externally threaded end of the piston rod 36 and a sleeve member 41 fitted over the rearward end of the gear selecting shaft 28 and over the plug member 40 and having an inwardly extending flange portion 42 adapted to engage the face of the plug member 40 nearest the piston and cylinder device 35. The sleeve member 41 is pinned to the gear selecting shaft 28 by a bolt 43 to insure rotation thereof with the shaft 28 while permitting rotation of the sleeve member 41 relative to the plug member 40 secured to the end of the piston rod 36. The relatively rotatable surfaces of the plug member 40 and the sleeve member 41 are preferably formed of bearing material to minimize any frictional drag therebetween. This structure insures axial movement of the gear selecting shaft 28 with the piston rod 36 yet permits rotation of the shaft 28 relative to the piston rod 36.

A pair of fluid ports 48 and 49 are formed one in each end of the piston and cylinder device 35 so that fluid pressure admitted to one end thereof will shift the piston rod 36 and the gear selecting shaft 28 in one direction and fluid pressure admitted to the other end will shift them in the opposite direction. Normally, the piston of the piston and cylinder device 35 is positioned in the cylinder in a neutral position midway between its limits of movement in the cylinder. After the shifting finger 30 has been rocked into engagement or alignment with any one of the shifting rails in the transmission 17, actuation of the piston and cylinder device 35 in either direction from the neutral position thereof will actuate said engaged shifting rail in either of two opposite directions to provide the desired gear shifting operation within the transmission 17.

In the embodiment of the invention disclosed herein, a suitable piston and cylinder device has been found to be a 2" cylinder marketed by the Westinghouse Air Brake Company under the designation 193100-TP-PXB. This piston and cylinder device 35 is shown in Fig. 8 and is of the type wherein a main piston 50 having a substantially smaller diameter than a cylinder 51 is positioned in a neutral position therein, as in Fig. 8, when fluid pressure is admitted equally to both ends of the cylinder 51. As shown in the drawing, this power device includes a pair of telescopically arranged piston-sleeve members 52 and 53 engageable both with the main piston 50 and with a stop member 54 secured in the cylinder 51 to determine the limits of movement and the neutral position of the main piston 50.

The portion of the invention mounted in the cab of a truck tractor or the like may best be described with reference to Figs. 2, 3, 9, and 10. An angled mounting bracket 60 for the shifting mechanism 15 may be secured either to the floor of the cab, on the dashboard, or, in a cab having a single seat for the driver, on the portion of the cab body adjacent the driver's position as shown in Fig. 3. Mounted on the bracket 60 is a valve assembly 61 of a well known type adapted to direct fluid pressure through either of the two conduits 18 and 19 connected thereto or equally through both of them. A valve assembly which has been found well suited from the shifting mechanism disclosed and illustrated herein is a valve assembly marketed by the Westinghouse Air Brake Company under the designation #191267. This valve assembly 61 includes three ports one of which is adapted to be connected to a source of fluid pressure through a conduit 62 and the other two of which are adapted to be connected by the conduits 18 and 19 to the ports 48 and 49, respectively, of the piston and cylinder device 35 to be controlled. The valve assembly 61 further includes a rock shaft 65 extending horizontally and transversely of the cab of the vehicle and adapted to control the operation of valve elements (not shown) in the valve assembly 61. In a central, neutral position of the shaft 65, fluid under pressure is directed equally to the two ports connected to the conduits 18 and 19 whereupon the main piston 50 of the piston and cylinder device 35 is positioned in its neutral position. When the shaft 65 is rotated in either direction from its neutral position, fluid pressure is directed to either one of the control ports while the other control port is vented or exhausted through the valve assembly 61.

A shifting lever generally designated at 66 is secured to an outwardly extending end of the valve shaft 65 so as to extend normally to the mounting bracket 60 when the shaft 65 is in its central or neutral position, as illustrated in Fig. 3. The valve shaft 65 extends through a bore 69 formed in the lower end of the shifting lever 66. The shifting lever 66 is made up of two, separate, upper and lower members 67 and 68 which are interconnected so as to make the lever 66 rigid in the direction extending forwardly and rearwardly of the vehicle cab while permitting pivotal movement of the upper member 67 relative to the lower member 68 in a direction transversely of the cab of the vehicle.

The details of the structure of the shifting lever 66 are best shown in Figs. 9 and 10. The lower member 68 of the shifting lever 66 is secured to the valve shaft 65 by a set screw 70 and has a pair of upwardly extending, forwardly and rearwardly spaced arms 73 and 74 having aligned, transverse bores 75 formed therein. A centrally disposed, vertical bore 7 is formed in the lower member 68 and extends downwardly from between the arms 73 and 74 until it intersects the bore 69. The set screw 70 is threaded into a lower tapped portion of the bore 77 to secure the shifting lever 66 to the valve shaft 65 in a desired position. A ball 80 is disposed in the centrally disposed recess 77 and is urged upwardly for reasons to be explained hereinafter by a spring member 81 disposed in the recess 77 and resting on the set screw 70.

The lower end of the upper lever mmber 67 is adapted to fit between the two spaced arms 73 and 74 of the lower lever member 68 and the member 67 is provided with a transverse bore 83 adapted to be aligned with the bores 75 formed in the two arms 73 and 74 of the lower lever member 68. Means such as a pin or a nut and bolt device 84 is passed through the aligned bores 75 and 83 formed in the arms 73 and 74 of the lower member 68 and in the lower portion of the upper lever member 67, respectively, for pivotally connecting the upper and lower lever members 67 and 68 together. The bottom surface of the upper lever member 67 is generally rounded or arcuately shaped and has an indentation 85 formed therein in axial alignment with the upper lever member 67. The ball 80 associated with the lower lever member 68 is urged into the indentation 85 so as to provide a spring detent adapted to resiliently lock the upper and lower lever members 67 and 68 in axial alignment or a neutral position transversely of the cab. A spherical or other shaped member 86 may be secured to the upper end of the shifting lever 66 to provide a hand grip or knob to facilitate movement of the shifting lever 66.

With the structure described herein, it is evident that the shifting lever 66 as a whole is rigid in a direction extending forwardly and rearwardly of the vehicle cab so that movement of the shifting lever 66 in said forwardly and rearwardly directions will rotate the valve shaft 65 of the valve assembly 61 in either direction from its neutral position. It is further evident that the upper lever member 67 may be pivoted from its normal, detent locked position in axial alignment with the lower lever member 68 in opposite directions transversely of the vehicle cab when the shifting lever 66 is in its neutral position forwardly and rearwardly of the cab without affecting any change in the position of the valve shaft 65.

A generally cylindrical fixture 88 is secured to the lower lever member 68, as by welding, in axial alignment with the valve shaft 65 so as to extend normally away from the lower lever member 68. The fixture 88 has a swivel eye 89 mounted on its outer end. An arm 90 extends normally away from the upper lever member 67 at a point spaced above the pivot connection between the upper and lower lever members 67 and 68 and in the transversely neutral position of the upper lever member 67 a small bore 91 formed adjacent the end of the arm 90 is aligned with the swivel eye 89 mounted in the fixture 88.

As previously noted, the portion 15 of the invention located in the cab of a vehicle and the portion 16 disposed adjacent the transmission 17 are interconnected only by flexible means, the two flexible fluid conduits 18 and 19 leading from the valve assembly 61 to the piston and cylinder device 35 and the flexible control cable 20.

The control cable 20 includes an outer cable member 92 and an inner cable member 93 movable relatively to the outer cable member 92 lengthwise thereof. One end of the outer cable member 92 is clamped in the swivel eye 89 carried in the fixture 88 on the lower lever member 68 and the other end thereof is clamped to the end of an extension arm 94 secured to the casing portion 23 of the transmission bracket 22 by a clamping member 95. As shown in Figs. 5 and 6, the extension arm 94 extends away from the casing portion 23 at an angle thereto so that the clamped end of the outer cable member 92 acting as a guide for the inner cable member 93 lies substantially in a vertical plane extending normally to the axis of the gear selecting shaft 28 and passing through the ball and stud assembly 34 carried on the end of the crank arm 33 on the shaft 28. The transmission end of the inner cable member 93 is operably connected to the ball and stud assembly 34 carried on the end of the crank arm 33 and the other end thereof extends through the small bore 91 in the end of the arm 90 extending from the upper lever member 67 where it is adjustably clamped by a pair of releasable clamp devices 96 disposed one on either side of the arm 90. By merely loosening the clamp devices 96 the inner cable member 93 may easily be disconnected from the arm 90 and adjusted relative to the outer cable member 92. Obviously, the shifting lever end of the cable member 93 is clamped relative to the arm 90 when the shifting lever 66 is in its neutral position transversely of the cab and when the gear selecting shaft 28 is in its rockable neutral position. To insure most effective operation of the control cable 20, a lubricant should be provided therefor. Additionally, it is desirable to provide means for keeping dirt and other foreign matter from getting into the control cable 20, particularly at the transmission end thereof. As shown in Fig. 6 in broken lines, a sleeve member or length of tubing 97 may be provided to enclose the transmission end of the outer cable member 92 from which extends the end of the inner cable member 93 connnected to the ball and stud assembly 34. In the embodiment shown and described herein, the control cable 20 is a two-way or double-acting device. It is believed evident that with some slight modification, a single-acting cable could be effectively used in the invention.

It is thus seen that pivoting the upper member 67 of the shifting lever 66 transversely of the cab in either direction from its neutral position while the shifting lever 66 is in a neutral valve position will rock the shifting finger 30 in the transmission 17 through the action of the control cable 20 in either direction from its neutral position into selective engagement or alignment with any one of the shifting rails. It is further seen that forward or rearward movement of the shifting lever 66 while the shifting finger 30 is in alignment or engagement with one of the shifting rails will actuate the valve assembly 61 to direct pressure to one or the other end of the piston and cylinder device 35, thus axially moving the gear selecting shaft 28 in either direction from its axial neutral position to provide the desired gear shifting operation within the transmission 17.

It is noted that the bottom portion of the lower lever member 68 is provided with a pair of angular projections 98 adapted to be rotated into engagement with an abutment 99 formed on the valve assembly 61 so as to limit the forward and rearward movements of the shifting lever 66, as best shown in Fig. 3.

The operation of the invention is believed evident from the discussion and description herein. It is noted, referring particularly to Fig. 11, that the operable shifting positions of the hand grip 86 of the shifting lever 66 are the same standard positions utilized in most vehicles of the truck class. Position A is the neutral position with the other positions being noted as follows: B, first forward position; C, second forward position; D, third forward position; E, fourth forward position; F, fifth forward position; G, low reverse position; and H, high reverse position.

As the invention contemplates no change in the known type mechanical truck transmission other than the means for supporting and actuating the shifting finger, a detailed description of the transmission and the operation thereof is not deemed necessary for a full disclosure of the invention.

It will be understood that certain changes may be made in the construction or arrangement of the gear shifting device disclosed herein without departing from the spirit and scope of the invention as defined in the appended claims.

I claim:

1. In a truck tractor or the like of the cab-over-motor type wherein a mechanical transmission including the usual shifting finger is disposed behind the cab, a gear selecting shaft supported adjacent the transmission for axial and rotatable movements, means mounting the shifting finger on said shaft so that the finger extends into the transmission, the finger being adapted to provide gear shifting operations in the transmission in the usual manner upon a sequence of movements of said shaft first rotatably and then axially, a crank arm secured to one end of said shaft for rotating said shaft, a piston and cylinder device supported adjacent the transmission and having a piston rod operably connected to the other end of said shaft, actuation of said piston and cylinder device providing axial movement of said shaft, a manual shifting lever mounted in the cab for shifting movements transversely of the cab and forwardly and rearwardly thereof, a flexible, control cable connected between said shifting lever and the end of said crank arm and adapted to provide rotatable movement of said shaft upon movement of said shifting lever transversely of the cab, a valve mounted in the cab and connected to a source of pressure, and flexible conduit means connected between said valve and said piston and cylinder device, said valve being controlled by said movement of said shifting lever forward and rearwardly of the cab to actuate said piston and cylinder device and thus provide axial movement of said shaft.

2. Transmission operating means for a tilt cab, truck tractor or the like of the cab-over-motor type wherein a mechanical transmission including the usual shifting finger is located to the rear of the cab comprising, a shifting lever mounted in the cab for shifting movements transversely of the cab and forwardly and rearwardly thereof, a gear selecting rock shaft mounted for axial movement adjacent the transmission, means securing the shifting finger to said shaft so that the finger extends into the transmission and is adapted to be successively rocked into engagement with any one of a series of shifting rails and then shifted axially in either of two directions to actuate the shifting rail with which it is engaged, means for rocking the shifting finger upon said transverse movement of said shifting lever comprising a crank arm secured to said shaft and a flexible control cable connected between said shifting lever and the end of said crank arm, and means adapted to provide axial movement of the shifting finger upon said forward and rearward movement of said shifting lever comprising a valve actuated by said movement of said lever, a piston and cylinder device mounted adjacent the transmission and operably connected to said shaft, and flexible conduit means interconnecting said valve and said piston and cylinder device.

3. Transmission operating means for a truck tractor or the like of the cab-over-motor type wherein the mechanical transmission including the usual shifting finger is disposed behind the cab comprising, a shifting lever mounted in the cab for shifting movements transversely of the cab and forwardly and rearwardly thereof, a gear selecting shaft supported adjacent the transmission for rocking and axial movements, means securing the shifting finger to said shaft so that the finger extends into the transmission, a flexible, double-acting, motion transmitting cable connected between said shifting lever and said shaft adapted upon transverse movement of said lever to rock the shifting finger into engagement with one of a series of shifting rails disposed in said transmission, a valve controlled by said forward and rearward movement of said lever to direct fluid pressure to either of two outlet ports, a piston and cylinder device supported adjacent the transmission, means connecting the piston rod of said device to one end of said shaft, and flexible conduit means connecting the two outlet ports of said valve to opposite ends of said piston and cylinder device whereupon forward or rearward movement of said shifting lever in the cab is adapted to axially shift said shaft in one of two directions so that the shifting finger actuates the shifting rail with which it is engaged in one of said two directions to provide a gear shifting operation in the transmission.

4. Transmission shifting means for a mechanical transmission having the usual shifting finger and which is physically spaced from the operating handle therefor comprising, a piston and cylinder device supported adjacent the transmission, a gear selecting shaft supported for axial and rotatable movement adjacent the transmission, means mounting the shifting finger on said shaft so that the finger extends into the transmission, means connecting one end of said shaft to said piston and cylinder device, the finger being adapted to be shifted axially through actuation of said cylinder and piston device in opposite directions from a neutral position into one of two gear shifting positions, a crank arm secured to the other end of said shaft and adapted to be rotated in opposite directions from a neutral position to rock the shifting finger between a series of ready positions for gear shifting operations, an operating handle physically spaced from the transmission and mounted for movements in two directions normal to each other, a flexible, motion transmitting control cable connected between said operating handle and the end of said crank arm and adapted upon movement of said operating handle in one of said directions to rock the shifting finger into one of said ready positions, a valve controlled by movement of said operating handle in the other of said directions, and flexible conduit means connected between said valve and said piston and cylinder device whereupon movement of said operating handle in said other direction actuates said valve whereby to control a flow of fluid pressure through said flexible conduit means to actuate said piston and cylinder device and move the shifting finger when in one of said ready positions away from said neutral position to a gear shifting position.

5. Transmission operating means for a tilt cab, truck tractor or the like of the cab-over-motor type wherein the mechanical transmission including the usual shifting finger is located to the rear of the cab comprising, a shifting lever mounted in the cab for shifting movements transversely of the cab and forwardly and rearwardly thereof, means supporting the shifting finger in the transmission for rocking movement selectively into engagement with any one of a series of shifting rails disposed therein and for movement normal to said rocking movement while in engagement with any one of the rails to actuate said rail in either of two opposite directions to provide the desired gear shifting operation, means for rocking the shifting finger upon said transverse movement of said shifting lever comprising a crank arm operably connected to the shifting finger and a flexible, motion transmitting control cable connected between said shifting lever and said crank arm, and means for moving the shifting finger normal to said rocking movement upon said forward and rearward movement of said shifting lever comprising a valve actuated by said forward and rearward movement of said lever to direct fluid pressure to either of two outlets, a piston and cylinder device mounted adjacent the transmission and operably connected to the shifting finger, and flexible conduit means interconnecting said two outlets of said valve and opposite ends of said piston and cylinder device.

6. Transmission operating means for a truck tractor or the like of the cab-over-motor type wherein the mechanical transmission including the usual shifting finger is located behind the cab comprising, a shifting lever mounted in the cab for shifting movements transversely of the cab and forwardly and rearwardly thereof, a hydraulic valve adapted to be actuated by said lever when moved forwardly and rearwardly of the cab to direct air pressure to either of two outlets, a gear selecting shaft supported adjacent the transmission for rocking and axial movements, a double-acting hydraulic piston and cylinder device supported adjacent the transmission, means connecting the piston rod of said device to one end of said shaft, said connecting means permitting rocking movement of the shaft relative to the piston rod, a crank arm connected to the other end of said shaft, means mounting the shifting finger on said shaft so that the finger extends into the transmission, a flexible control cable connected between said shifting lever and said crank arm and operable upon said transverse movement of said lever to selectively rock the shifting finger into engagement with any one of a series of shifting rails disposed in the transmission, and a pair of flexible, fluid conduits connecting said valve outlets of said lever controlled hydraulic valve to opposite ends of said piston and cylinder device where upon said forward and rearward movements of said shifting lever in the cab actuates said valve to direct air pressure through one of said flexible conduits to one end of said piston and cylinder device whereby to axially move the shifting finger to actuate the shifting rail with which it is engaged in either of two opposite directions to perform the desired gear shifting operation.

7. Transmission shifting means for an installation wherein a mechanical transmission and the operating handle therefor are physically located a considerable distance apart comprising, a supporting bracket having one end in the form of a casing secured over an opening in the top of the transmission and the other end in the form of a horizontal arm projecting away therefrom, a two-way air piston and cylinder device depending from the projecting arm of said bracket and having a piston rod extending toward the transmission, the piston of said device being normally centered in the cylinder in a neutral position, a horizontal, gear selecting rock shaft supported in the casing end of said bracket, said shaft being in alignment with said piston rod and adapted to be shifted longitudinally and rocked relative to said bracket, a coupling sleeve connecting one end of said shaft to the end of said piston rod and permitting rotation of said shaft relative to said piston rod, a crank arm secured to the other end of said rock shaft, means securing a shifting finger comprising a standard element of the transmission to said shaft so that the finger is adapted to be rocked through actuation of said crank arm in opposite directions from a neutral position selectively into engagement with any one of a series of shifting rails comprising standard elements of the transmission, a transmission operating handle supporting structure physically located a considerable distance from the transmission, a transmission operating handle mounted on said supporting structure for shifting movements in two directions normal to each other, a flexible, double-acting control cable connected between said operating handle and the end of said crank arm and adapted upon movement of said operating handle in one of said two directions to rock the shifting finger, a valve associated with said supporting structure and connected to a compressed air supply, said valve being controlled by movement of said operating handle in the other of said two directions to direct air pressure to either of a pair of outlet ports, and a pair of flexible conduits connected between said valve outlet ports and the two ends of said piston and cylinder device whereupon movement of said operating handle in said other direction moves said shaft longitudinally from a central, neutral position whereby the shifting finger actuates the shifting rail with which it is engaged in the usual manner in either of two opposite directions to perform a gear shifting operation.

References Cited in the file of this patent

UNITED STATES PATENTS 2,069,526   Kesling _____ Feb. 2, 1937